Feb. 7, 1961        J. D. BALL        2,971,091
RADIOACTIVITY LOGGING OF BOREHOLES
Filed Oct. 7, 1957
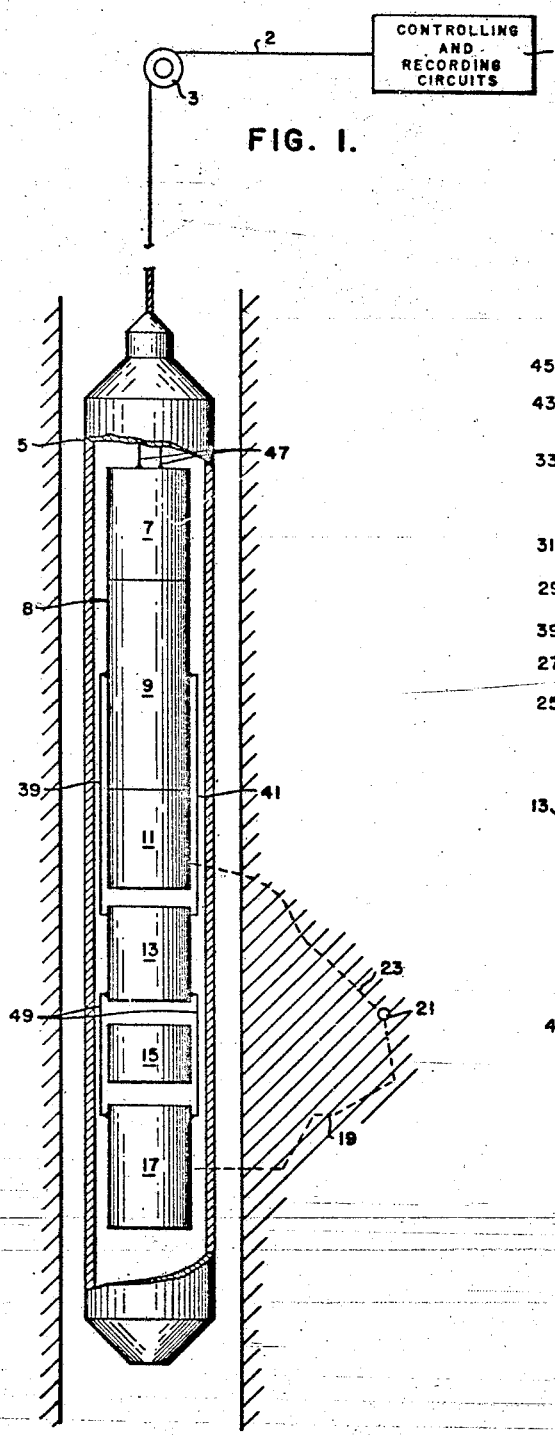
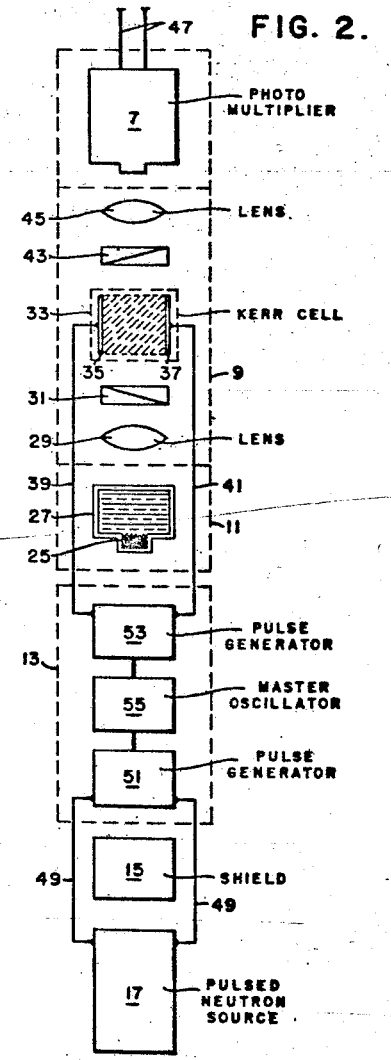
INVENTOR.
JOHN D. BALL,
BY John B. Davidson
ATTORNEY

United States Patent Office 2,971,091
Patented Feb. 7, 1961

2,971,091

RADIOACTIVITY LOGGING OF BOREHOLES

John D. Ball, Harris County, Tex., assignor, by mesne assignments, to Jersey Production Research Company, Tulsa, Okla., a corporation of Delaware Filed Oct. 7, 1957, Ser. No. 688,716

4 Claims. (Cl. 250—71.5)

This invention relates generally to the radioactivity logging of boreholes in the earth. More particularly, the invention relates to means for turning on and off a radiation detector.

In U.S. patent application Serial No. 616,687, entitled "Method of Nuclear Borehole Logging," filed October 18, 1956, now abandoned, by N. L. Muench and H. R. Brannon, Jr., there is described a method of borehole logging wherein subsurface formations are bombarded by primary radiation, (such as fast neutrons) to induce secondary radiation (such as gamma radiation) for the purpose of determining the presence and amounts of substances such as petroleum contained in the formation. The radiation source and the radiation detector are pulsed according to a predetermined program in order to differentiate between different types of induced radiation and/ or between the same type of radiation induced by different mechanisms. The advantages of a pulsed system over a continuously operated system are fully discussed in the above-cited patent application by N. L. Muench and H. R. Brannon, Jr. For the system to operate most efficently, it is necesary to turn the detector on and off in extremely short periods of time. Furthermore, it is desirable that the switching on and off of the detector be performed at a point in the system and in such a manner that gating pulses will not appear in the output of the detecting system.

The present invention is concerned with improvements in pulsed radiation detectors and is particularly useful in conjunction with the method of patent application Serial No. 616,687, now abandoned. In accordance with the teaching of the present invention, radiation is detected by a scintillation detector to produce bursts of light which are transmitted to a light detector (such as a photomultiplier) through light controlling means. The light controlling means may include at least two devices that selectively transmit light of only a given plane of polarization. Between these devices there is positioned means for controllably rotating the plane of polarization of light passing therethrough in accordance with an electric signal. The design of the plane-of-polarization ratating means may be such that the plane of polarization of the light issuing therefrom is periodically shifted between two orthogonal planes by the electric signal. The second of the light polarizing means is positioned so that light polarized on one of said orthogonally disposed planes will most efficiently pass therethrough. Light polarized on the other of the two planes will not pass through the second light polarizing means. Therefore, the electric signal controlling the plane-of-polarization rotating device will be effective to cut the light on and off. The light detecting means may be positioned at the output of the second of the light polarizing means so that the output signal thereof will be switched on and off by the electric signal controlling the plane-of-polarization rotating means.

In a preferred embodiment of the invention, the plane-of-polarization rotating means is a Kerr cell. The Kerr cell requires a minimum amount of power for its actuation, and its response time is substantially less than a microsecond.

Accordingly, an object of the invention is to provide an improved system of control for a radioactivity detector, particularly adapted for use in conjunction with a gated or pulsed radioactivity well logging system.

Another object of the invention is to provide a radioactivity logging system for boreholes of the type wherein a radioactivity source and radioactivity detector are turned and off for very short periods of time and wherein the gating signal will not appear in the output indications of the detector.

Other objects and features will appear from the following description of the invention when considered in connection with the accompanying drawning, wherein:

Fig. 1 is a schematic representation of a logging sonde such as is used in the practice of the invention, and Fig. 2 is a schematic diagram showing in more detail the configuration of the components of the radiation detector of Fig. 1 and its electrical circuit relationship to the other components of the apparatus shown in Fig. 1.

In Fig. 1 there is shown a logging sonde having an outer shell 5 and including a pulsed neutron source 17, a radiation detector 8, and electrical control apparatus 13 for the radiation detector 8 and pulsed neutron source 17. The pulsed neutron source may be any of several types known to the prior art wherein electrical signals coupled thereto turn the neutron source on and off for selected periods of time so that the neutron source will emit bursts of neutrons which may be directed at targets in the vicinity of the source. A specific example of a neutron source that may be utilized is described in U.S. Patent No. 2,769,096 to H. B. Frey, Jr. Electrical energy for turning the neutron source on and off is derived from control apparatus 13. Control apparatus 13 may consist of one or more pulse generators 51 and 53 which function to supply electrical energy to neutron source 17 for extremely short periods of time. The pulse generators may be controlled by a timing pulse generator or oscillator 55. The pulse generators may be of many desired types known to the prior art. Reference may be had to the text "Pulse Generators," by G. N. Glasoe and J. V. Lebaeqz, M.I.T. Radiation Lab Series, vol. 5, McGraw-Hill Book Company, Inc., New York 1948, for a discussion of pulse generators.

For use in connection with the present invention, it is desirable that the pulsed neutron source be turned on as quickly as possible for very short periods of time and then turned off. The "on" time of the pulse generator typically may be of the order of three microseconds and the "off" time of from ten or twelve microseconds up to 200 microseconds. The control apparatus should repetitively turn the pulsed neutron source on and off. Control apparatus 13 may be housed in the same chamber as radiation detector 8.

As shown in the drawing, a radiation shield 15 separates neutron source 17 from the rest of the apparatus and should be of a composition and thickness that will prevent the radiation detector from picking up more than a minimum amount of radiation directly from source 17. The radiation detector may comprise a scintillation detector 11 operable to emit light on interaction with radioactive rays, a light detector 7, and a control section 9 operable to gate light passing from scintillation detector 11 to the light detector. The light detector may be a photomultiplier of conventional design. A suitable radiation detector will be described in more detail with respect to Fig. 2. The output of photomultiplier 7 is coupled to controlling and recording circuits 1 at the earth's surface through electrical leads 47. The leads are brought to the earth's surface within a cable 2. The cable also may be used with reel 3 for hoisting and lowering the sonde.

The neutrons emitted by a pulsed neutron source 17 into the surrounding earth formation, as shown by dotted line 19, will strike a target, such as a hydrocarbon molecule 21, which will emit one or more gamma rays. One of the gamma rays may follow the path 23 to be detected by scintillation detector 11. The light emitted by detector 11 will be converted into an electrical signal by photomultiplier 7. It is to be noted that suitable electrical amplifiers of conventional design may amplify the output signal of photomultiplier 7. The signal is transmitted to the earth's surface on leads 47. Reference may be had to the above-cited U.S. patent application Serial No. 616,687, now abandoned, for a more complete discussion of the mechanism of borehole logging.

With reference now to Fig. 2, the scintillation type radiation detector may consist of an anthracene crystal 27 which is directly exposed to a stream of monoenergetic alpha rays emitted by a suitable substance 25, such as polonium, immediately adjacent thereto. Instead of polonium, other suitable sources of monoenergetic rays may be utilized, such as ionium. Gamma rays and fast neutrons that strike the anthracene to interact therewith cause the anthracene crystal to emit light impulses. These light impulses pass through a light control section 9 and may eventually be detected by light detector 7. The light control section 9 preferably comprises lenses 29 and 45, rectilinear light polarizing devices 31 and 43, and a plane-of-polarization rotating device 33 for rotating the light emitted by polarization device 31 between orthogonally disposed planes of polarization. In a preferred embodiment, the plane-of-polarization rotating device is a Kerr cell which may consist of an enclosure including a pair of plates 35 and 37 electrically insulated from each other. The enclosure may be filled with a suitable liquid such as pure nitrobenzene.

It is known that if a potential exists between the plates of a Kerr cell, the liquid of the cell has the property of becoming doubly refractive with an index of double refraction proportional to the square of the electric field between the plates perpendicularly to the passing light ray. The index of double refraction is also proportional to the length of the ray path through the electric field in the liquid. If the potential between the plates is zero, there is no double refraction and the polarization of the ray does not change. As soon as a potential is applied between the plates, the liquid in the cell becomes doubly refractive, and the plane of polarization of the light ray will be rotated as the ray passes through the cell.

Let it be assumed that light having a given plane of polarization enters Kerr cell 33 from light polarizer 31. Assume further that light polarizer 43 is positioned to most efficiently transmit light having the plane of polarization of light exiting from light polarizer 31 (i.e., to transmit the light with minimum attenuation). With zero potential between plates 35 and 37, light from the scintillation detector will be polarized by light polarizer 31, will suffer no rotation of Kerr cell 33, will pass through light polarizer 43, and will be focused on photomultiplier 7 by lens 45 to produce an output signal on leads 47.

A voltage between plates 35 and 37 will rotate the plane of polarization of the light passing through the Kerr cell so that it will be attenuated by light polarizer 43 to reduce the amplitude of the output signal on leads 47. When the voltage is increased to the point where the light is rotated 90 degrees, the light will be substantially completely attenuated.

Assume now that a train of voltage pulses of rectangular waveform is applied between plates 35 and 37 by control apparatus 13. The plane of polarization of light from Kerr cell 33 will be repetitively rotated back and forth between two planes. If the planes are orthogonally disposed, the light from light polarizer 43 will be turned on and off. Therefore, the output signal from photomultiplier 7 will be gated by the signal on leads 39 and 41 applied to plates 35 and 37.

As mentioned above, the electrical control circuitry means may consist of pulse generators 51 and 53 of conventional design. The pulse generators should be triggered or actuated from a master oscillator 55 to energize the neutron source and to actuate the plane-of-polarization rotating means repetitively according to a predetermined program. For example, assume that it is desired to detect gamma radiation produced by inelastic scattering of neutrons and to discriminate against gamma radiation produced by neutron capture. Assume further that the light from Kerr cell 33 will not pass through prism 43 when there is zero potential across the plates of the Kerr cell, so that pulsed neutron source 17 and Kerr cell 33 must be energized in synchronization. Should the prism 43 be rotated by 90 degrees so as to most efficiently transmit light passing through Kerr cell 33 when plates 35 and 37 are not energized, then the Kerr cell 33 and pulsed neutron source 17 should be energized in alternation to effect the same result. The use of a master oscillator to trigger two or more pulsed sources, either in phase or out of phase and for varying periods of time, is well known to the art and will not be dealt with further herein.

Note that the waveform of the voltage pulses applied to plates 35 and 37 need not vary between zero and a given value, but may vary between any two values other than zero that will rotate the light between orthogonally disposed planes. Under this circumstance, light polarizer 43 may be positioned to most completely attenuate light of one of the two planes. Note further that the light polarizer 43 may be positioned to most completely attenuate light polarized on either of the planes between which voltage pulses applied to plates 35 and 37 rotate the light passing through the Kerr cell. Light polarized on the other plane will then pass through the light polarizer with minimum attenuation.

Power for the various units described above may be derived from sources within the shell of sonde 5 or may be transmitted down the cable from controlling and recording circuits 1. The recording circuits for recording the output signals of photomultiplier 7 may be of conventional design.

If desired, Kerr cell 33 may be electromagnetically energized rather than electrostatically energized, as shown. In this event, it may be necessary to modify the output wave shapes from control apparatus 13 to some extent, but such modifications are well known in the radar and television arts and will present no difficulties.

The invention is not to be restricted to the specific structural details, arrangements of parts, or circuit connections herein set forth, as various modifications thereof may be effected without departing from the spirit and scope of this invention.

What is claimed is:

1. Apparatus for radioactivity logging of a borehole, comprising: an electrically actuable neutron source adapted to bombard earth formations with fast neutrons; scintillation type radiation detector means adapted to emit light rays upon reception of radiation from surrounding earth formations; first light polarizing means for rectilinearly polarizing light rays emitted by said detector; plane-of-polarization rotating means positioned to receive light from said first light polarizing means adapted to rotate the plane of polarization of light rays from said first light polarization means between first and second orthogonally disposed planes of polarization responsive to an energizing signal from said electric control means; second light polarizing means for transmitting light of only one of said first and second planes of polarization from said control means to a light sensitive detector; and electrical control means coupled to said neutron source and to said plane-of-polarization rotating means to repetitively actuate said neutron source and said plane-of-polarization rotating means according to a predetermined program.

2. Apparatus for radioactivity logging of a borehole, comprising: electric control means; an electrically actuable neutron source connected to said electric control means, adapted to bombard earth formations with fast neutrons responsive to energization thereof by said electric control means; scintillation type radiation detector means adapted to emit light rays upon reception of radiation from surrounding earth formations; a light detector adapted to produce an output signal upon reception of light from said scintillation counter; light control means connected to said electric control means for selectively transmitting light from said radiation detector to said light detector responsive to energization thereof by a control signal from said electric control means; said electric control means being adapted to repetitively actuate said light control means and said neutron source according to a predetermined program.

3. Apparatus for radioactivity logging of a borehole comprising: a pulsable neutron source adapted to repetitively bombard earth formations while discrete bursts of fast neutrons; light detector means adapted to produce an electrical output signal responsive to impingement of light rays thereon scintillation type radiation detector means adapted to emit light rays upon reception of radiation from surrounding earth formations; first light polarizing means positioned to rectilinearly polarize light rays from said radiation detector; control means including plane-of-polarization rotating means adapted to repetitively rotate the plane of polarization of light rays from said first light polarizing means between first and second orthogonally related planes of polarization in a timed sequence related to emission of said discrete bursts of fast neutrons by said neutron source; second light polarizing means positioned between said control means and said light detector means to transmit light of only one of said first and second planes of polarization from said control means to said light detector means.

4. Apparatus for detecting radioactivity over short periods of time, comprising: a scintillation type radiation detector; a light detector; light polarizing means positioned to transmit light from said radiation detector, the light transmitted by said light polarizing means having only a given plane of polarization; plane-of-polarization rotating means positioned to receive polarized light from said polarizing means and, when actuated by an electrical signal coupled thereto, adapted to rotate light from said light polarizing means alternately between first and second orthogonally disposed planes; second light polarizing means positioned to preferentially transmit light of one of said two planes-of-polarization from said plane-of-polarization rotating means to said light detector; and electrical control means coupled to said plane-of-polarization rotating means adapted to actuate said plane-of-polarization rotating means.

References Cited in the file of this patent

UNITED STATES PATENTS

| 1,974,067 | Gray | Sept. 18, 1934 |
| 2,648,012 | Scherbatskoy | Aug. 4, 1953 |
| 2,769,096 | Frey | Oct. 30, 1956 |
| 2,857,522 | Jones | Oct. 21, 1958 |

FOREIGN PATENTS

| 724,441 | Great Britain | Feb. 23, 1955 |